United States Patent [19]
Tsutsumi

[11] Patent Number: 5,561,560
[45] Date of Patent: Oct. 1, 1996

[54] ZOOM LENS SYSTEM

[75] Inventor: Katsuhisa Tsutsumi, Saitama-ken, Japan

[73] Assignee: Fuji Photo Optical Co., Ltd., Saitama-ken, Japan

[21] Appl. No.: 398,080

[22] Filed: Mar. 3, 1995

[30] Foreign Application Priority Data

Mar. 9, 1994 [JP] Japan .................................. 6-038606

[51] Int. Cl.6 ............................................. G02B 15/14
[52] U.S. Cl. .................................................. 359/683
[58] Field of Search ........................................... 359/683

[56] References Cited

U.S. PATENT DOCUMENTS

| | | |
|---|---|---|
| 4,245,891 | 1/1981 | Doi et al. .............................. 359/683 |
| 4,560,254 | 9/1985 | Yoshikazu et al. ..................... 359/676 |
| 5,050,972 | 9/1991 | Mukaiya et al. ....................... 359/683 |

*Primary Examiner*—Georgia Y. Epps
*Assistant Examiner*—Evelyn A. Lester
*Attorney, Agent, or Firm*—Sixbey Friedman Leedom & Ferguson; Gerald J. Ferguson, Jr.; Evan R. Smith

[57] ABSTRACT

A zoom lens system consists of a first lens group G1 which has a positive refracting power and is held stationary when zooming, second, third and fourth lens groups G2, G3 and G4 which are moved when zooming, a stop and a fifth lens group G5 for image-forming. The first to fourth lens groups G1 to G4, the stop and the fifth lens group G5 are arranged in this order from the object side. The second to fourth lens groups G2 to G4 are moved during zooming with the distance between the third and fourth lens groups G3 and G4 controlled so that the fluctuation in coma with change in the zooming position is well suppressed.

11 Claims, 17 Drawing Sheets

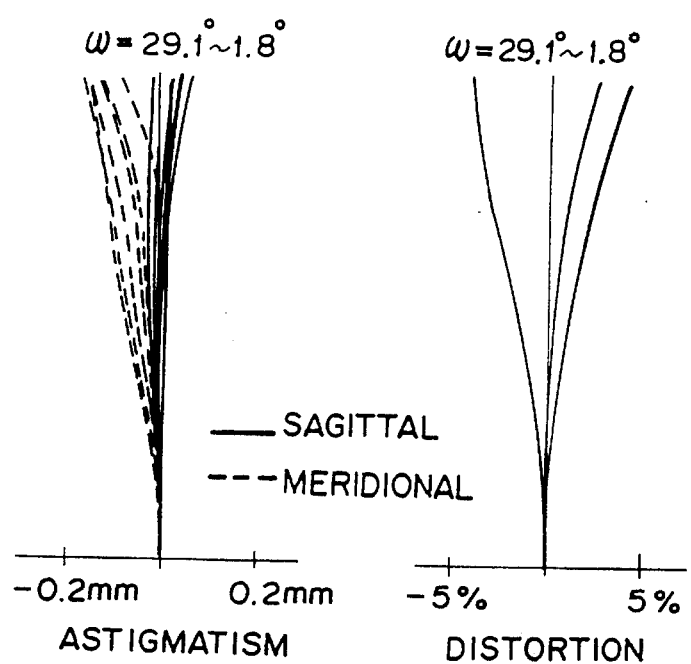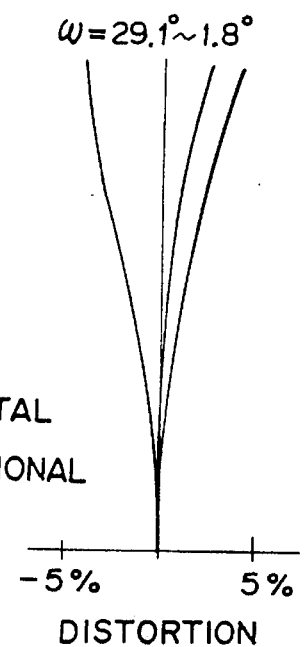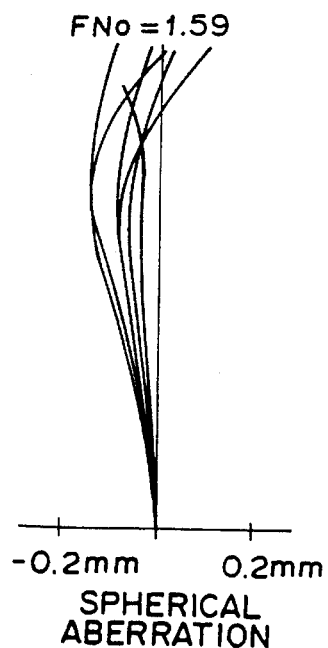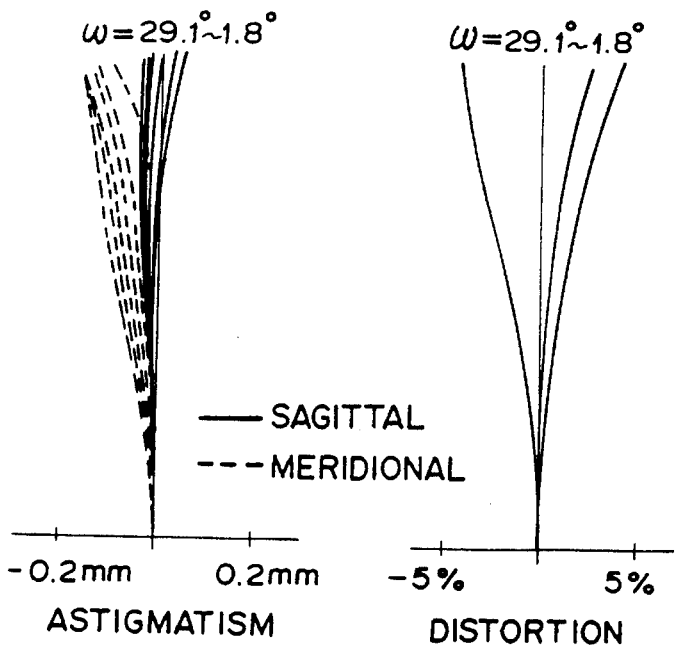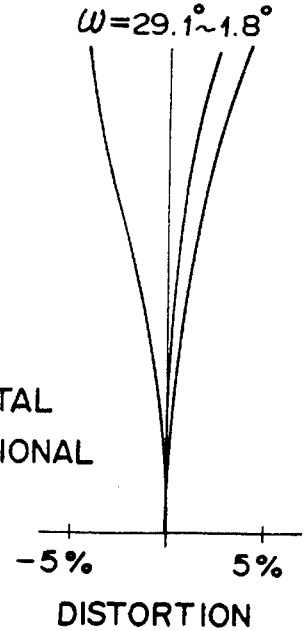

FIG.12A
FNo=1.59
-0.2mm  0.2mm
SPHERICAL
ABERRATION
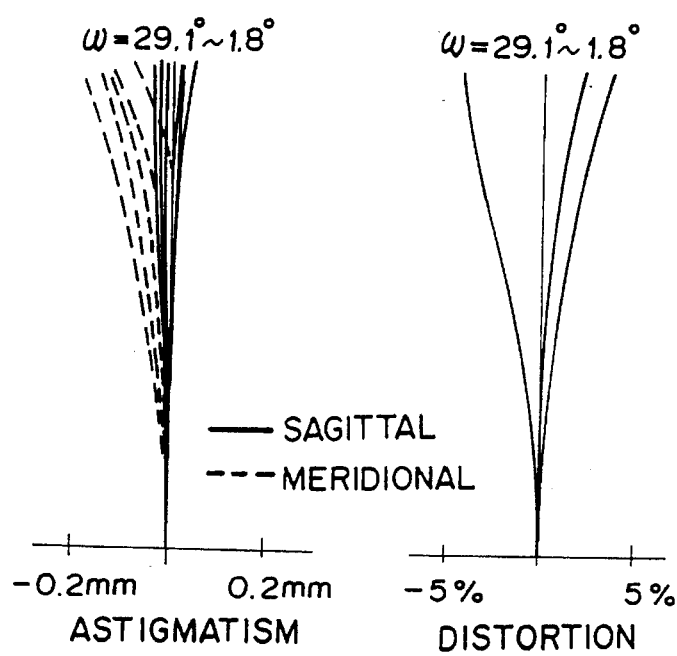
FIG.12B
ω=29.1°~1.8°
—— SAGITTAL
--- MERIDIONAL
-0.2mm  0.2mm
ASTIGMATISM
FIG.12C
ω=29.1°~1.8°
-5%  5%
DISTORTION
FIG.13A
FNo=1.59
-0.2mm  0.2mm
SPHERICAL
ABERRATION
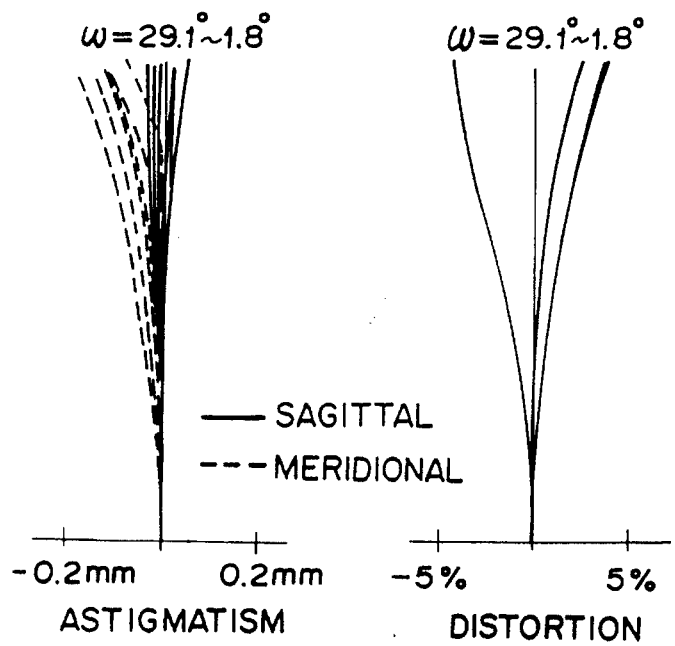
FIG.13B
ω=29.1°~1.8°
—— SAGITTAL
--- MERIDIONAL
-0.2mm  0.2mm
ASTIGMATISM
FIG.13C
ω=29.1°~1.8°
-5%  5%
DISTORTION FIG.14A
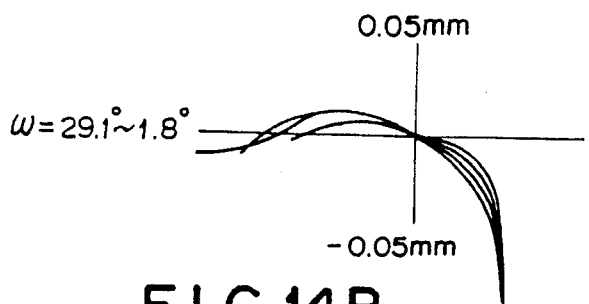
FIG.14B
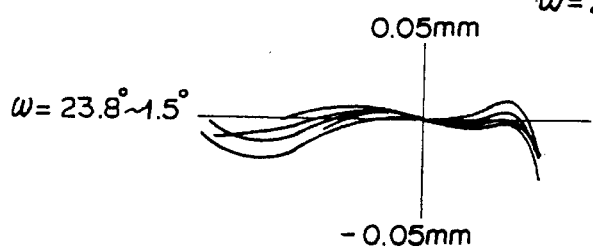
FIG.14C
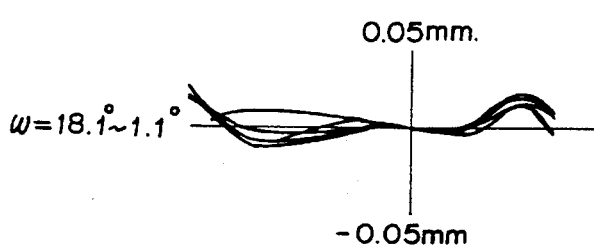
FIG.14D
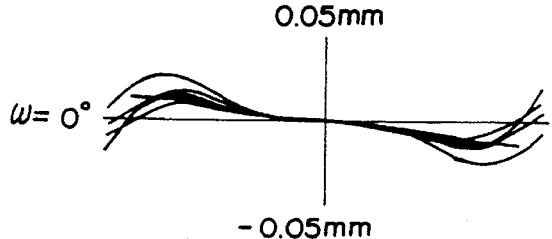
FIG.15A
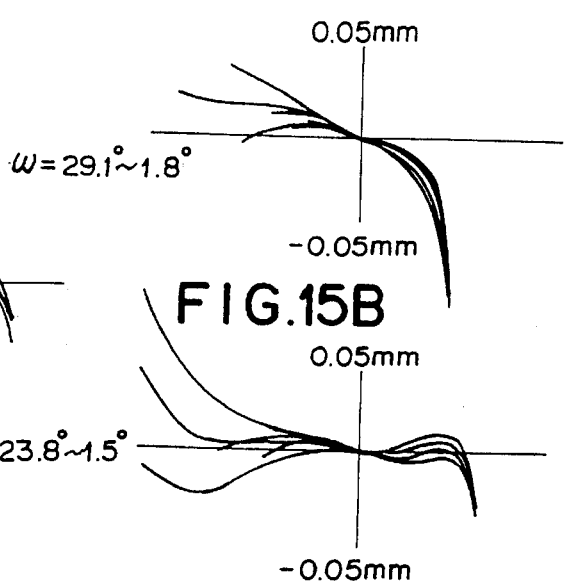
FIG.15B
FIG.15C
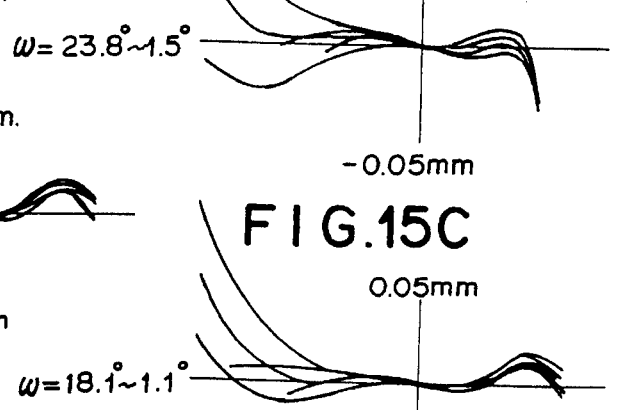
FIG.15D
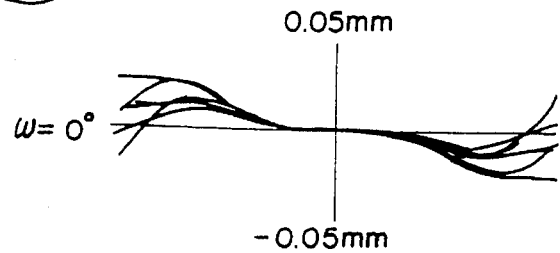

FIG.16A
FNo=2.25
-0.2mm  0.2mm
SPHERICAL
ABERRATION
FIG.16B
ω=35.4°~1.7°
—— SAGITTAL
--- MERIDIONAL
-0.2mm  0.2mm
ASTIGMATISM
FIG.16C
ω=35.4°~1.7°
-5%  5%
DISTORTION
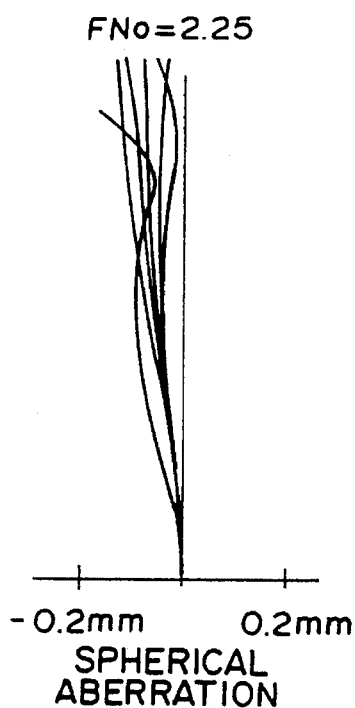
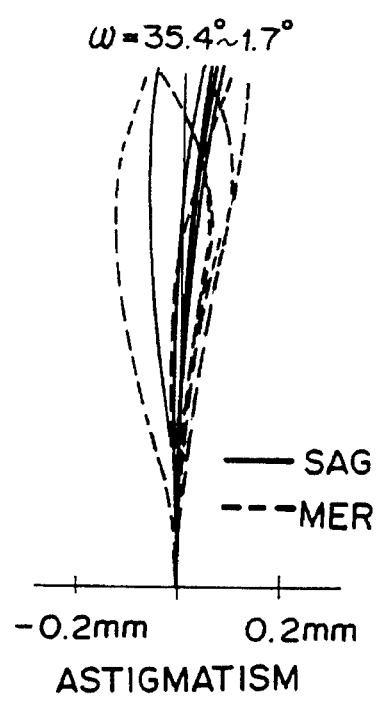
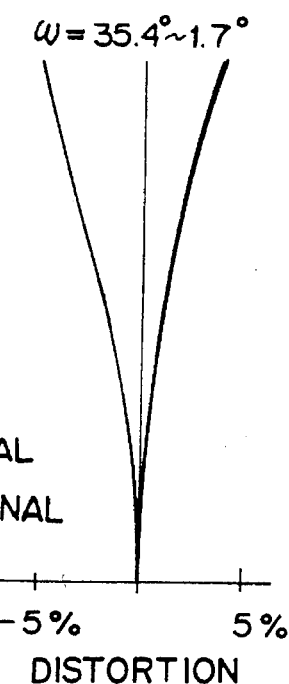
FIG.17A
FNo=2.25
-0.2mm  0.2mm
SPHERICAL
ABERRATION
FIG.17B
ω=35.4°~1.7°
—— SAGITTAL
--- MERIDIONAL
-0.2mm  0.2mm
ASTIGMATISM
FIG.17C
ω=35.4°~1.7°
-5%  5%
DISTORTION
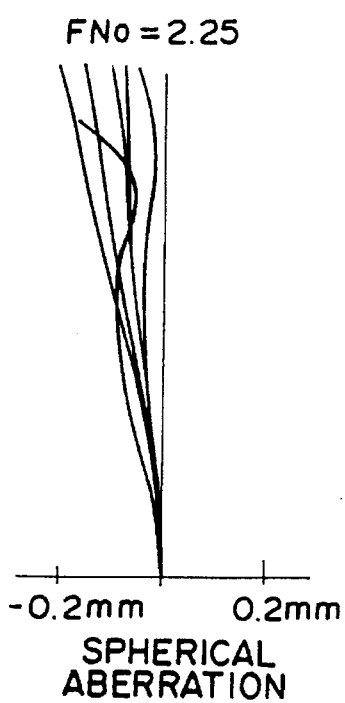
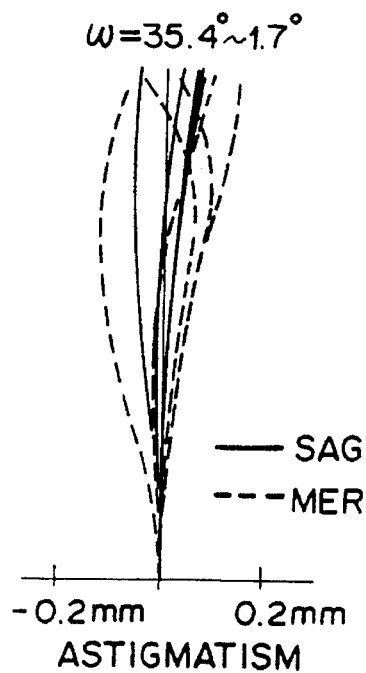
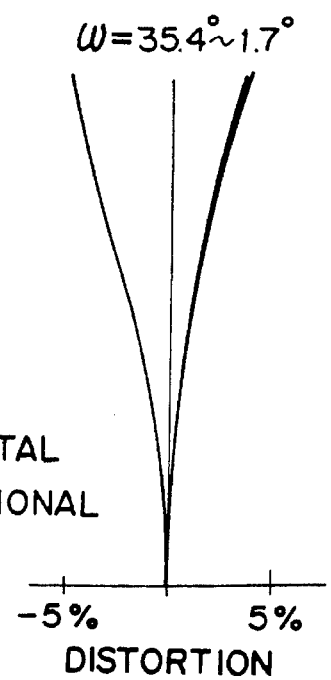

FNo=2.25

−0.2mm  0.2mm
SPHERICAL
ABERRATION

ω=35.2°~1.7°

—— SAGITTAL
--- MERIDIONAL

−0.2mm  0.2mm
ASTIGMATISM

ω=35.2°~1.7°

−5%  5%
DISTORTION

FNo=2.25

−0.2mm  0.2mm
SPHERICAL
ABERRATION

ω=35.2°~1.7°

—— SAGITTAL
--- MERIDIONAL

−0.2mm  0.2mm
ASTIGMATISM

ω=35.2°~1.7°

−5%  5%
DISTORTION

FNo=2.25

-0.2mm 0.2mm
SPHERICAL
ABERRATION

ω=35.1°~1.7°

——— SAGITTAL
--- MERIDIONAL

-0.2mm 0.2mm
ASTIGMATISM

ω=35.1°~1.7°

-5%    5%
DISTORTION

FNo=2.25

-0.2mm 0.2mm
SPHERICAL
ABERRATION

ω=35.1°~1.7°

——— SAGITTAL
--- MERIDIONAL

-0.2mm 0.2mm
ASTIGMATISM

ω=35.1°~1.7°

-5%    5%
DISTORTION

ZOOM LENS SYSTEM

BACKGROUND OF THE INVENTION

1. Field of the Invention

This invention relates to a large aperture, wide-angle, high performance zoom lens system whose magnification can be changed over a wide range, and more particularly to such a zoom lens system especially suitable for a TV camera.

2. Description of the Prior Art

A zoom lens system for a TV camera is required to be large both in aperture and angle of view, to be small in size, to be able to change its magnification over a wide range, to be able to take a closeup at a short distance and to be well corrected in aberrations. There have been developed various zoom lens systems to meet such requirements.

For example, in the zoom lens system disclosed in U.S. Pat. No. 4,245,891, a corrective lens group having a weak refracting power is disposed on the object side of a concave lens group which forms a zoom lens group together with a convex lens group and distortion of the zoom lens system is compensated for by moving the corrective lens group when zooming.

However in the zoom lens system, it is difficult to effectively suppress fluctuation in coma with change in the zooming position of the lens system though fluctuation in distortion can be effectively suppressed.

In the zoom lens system disclosed in U.S. Pat. No. 4,560,254, the zoom lens group consists of a concave lens group and a pair of convex lens groups, and when zooming, the convex lens groups are moved so that the distance therebetween is changed so as to shorten the distance of movement of the concave lens group, whereby fluctuation in distortion is effectively compensated for.

Also in the zoom lens system, though fluctuation in distortion can be effectively suppressed, it is difficult to effectively suppress fluctuation in other aberrations especially coma.

Further when the aperture and the angle of view are enlarged, the size of the lens system is reduced, the variable range of magnification is widened and the closeup distance is shortened in the conventional zoom lens systems, fluctuation in coma and the like becomes too large.

SUMMARY OF THE INVENTION

In view of the foregoing observations and description, the primary object of the present invention is to provide a zoom lens system which has a large aperture, a large angle of view and a wide variable range of magnification and in which fluctuation in aberrations especially coma with change in the zooming position of the lens system is effectively suppressed.

The zoom lens system of the present invention comprises a first lens group G1 which has a positive refracting power and is held stationary when zooming, second, third and fourth lens groups G2, G3 and G4 which are moved when zooming, a stop and a fifth lens group G5 for image-forming, the first to fourth lens groups G1 to G4, the stop and the fifth lens group G5 being arranged in this order from the object side, wherein the second to fourth lens groups G2 to G4 are moved during zooming with the distance between the third and fourth lens groups G3 and G4 controlled so that the fluctuation in coma with change in the zooming position is well suppressed.

Preferably the zoom lens system of the present invention satisfies the following formula (1).

$$0.10 \leq f_{G3}/f_{G4} \leq 1.05 \quad \text{---} \tag{1}$$

wherein $f_{G3}$ and $f_{G4}$ respectively represent the focal lengths of the third and fourth lens groups G3 and G4.

The fluctuation in coma with change in the zooming position can be well suppressed, for instance, by restricting short the distance between the intersection at which part of marginal light rays (those imaged on a marginal portion of the image-forming plane) which is on the optical-axis side of the chief ray (a light ray passing through the center of the stop) on the image-forming-plane side of the stop intersects the image-forming plane and the intersection at which the chief ray intersects the image-forming plane.

With the arrangement described above, especially on the wide-angle side, the distance from the optical axis of said marginal rays when passing through the first lens group G1 remote from the stop is short, whereby coma flare generated on one side of the chief ray is reduced and at the same time fluctuation in spherical aberration, distortion and the like can be suppressed. Thus in accordance with the present invention, fluctuation in coma and other aberrations with change in the zooming position can be well suppressed.

Further by shortening the distance from the optical axis of said marginal rays when passing through the first lens group G1, the closeup distance can be shortened, the amount of light in the marginal portion of the image can be increased and the image circle can be enlarged.

When formula $$0.10 \leq f_{G3}/f_{G4} \leq 1.05 \quad \text{---} \tag{1}$$

is satisfied, fluctuation in coma with change in the zooming position can be better suppressed as well as fluctuation in spherical aberration and distortion.

BRIEF DESCRIPTION OF THE DRAWINGS

FIGS. 14A to 14D show lateral aberration of the zoom lens system in accordance with the second embodiment of the present invention at different angles of view (2ω) at a given image height, FIGS. 15A to 15D are views similar to FIGS. 14A to 14D showing lateral aberration of the zoom lens system of the second control, FIGS. 16A to 16C respectively show longitudinal aberrations (spherical aberration, astigmatism and distortion) of the zoom lens system in accordance with the third embodiment of the present invention, FIGS. 17A to 17C respectively show longitudinal aberrations (spherical aberration, astigmatism and distortion) of the zoom lens system of a third control.

DESCRIPTION OF THE PREFERRED EMBODIMENTS

Figure 1:
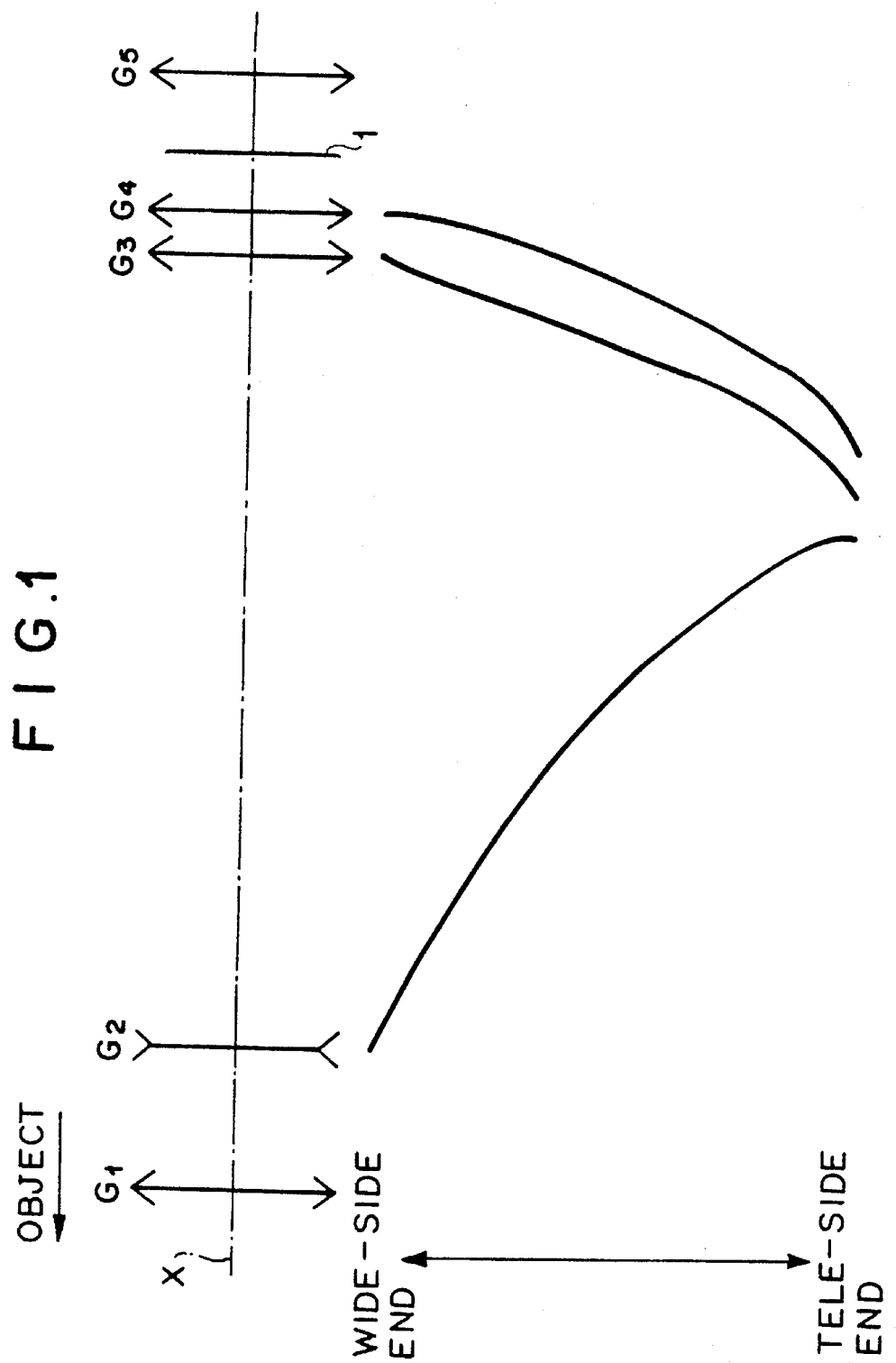
FIG. 1 is a schematic view showing positions of the movable lens groups relative to each other from the wide-side end to the tele-side end in the zoom lens system of the present invention.

As shown in FIG. 1, the zoom lens system of the present invention generally comprises a first lens group G1 which has a positive refracting power and is held stationary when zooming, second, third and fourth lens groups G2, G3 and G4 which are moved when zooming, a stop and a fifth lens group G5 for image-forming. The first to fourth lens groups G1 to G4, the stop and the fifth lens group G5 are arranged in this order from the object side.

When the zoom lens system is zoomed from the wide-side end to the tele-side end, the second lens group G2 is fed rearward in such a manner that the rate of movement of the second lens group G2 is reduced as the zooming position approaches the tele-side end and the third and fourth lens groups G3 and G4 are fed in such a manner that the distance therebetween is once increased and then gradually reduced as the zooming position approaches the tele-side end as shown in FIG. 1.

The distance between the third and fourth lens groups G3 and G4 is controlled so that the fluctuation in coma with change in the zooming position is suppressed, that is, so that the distance from the optical axis X of marginal rays when passing through the first lens group G1 is short on the wide-angle side. Accordingly, in the zoom lens system, coma flare of part of the marginal light rays which is on the optical-axis side of the chief ray on the image-forming-plane side of the stop is reduced.

Further in the zoom lens systems of first to fifth embodiments of the present invention to be described later, the following formula (1) is satisfied.

$$0.10 \leq f_{G3}/f_{G4} \leq 1.05 \text{ - - -} \tag{1}$$

wherein $f_{G3}$ and $f_{G4}$ respectively represent the focal lengths of the third and fourth lens groups G3 and G4.

When formula (1) is satisfied, fluctuation in coma with change in the zooming position can be better suppressed as well as fluctuation in spherical aberration and distortion. When $f_{G3}/f_{G4}$ is larger than 1.05, fluctuation in neither of coma and spherical aberration with change in the zooming position can be effectively suppressed, when $f_{G3}/f_{G4}$ is smaller than 0.10, fluctuation of none of coma, spherical aberration and distortion can be effectively suppressed.

Figure 2:
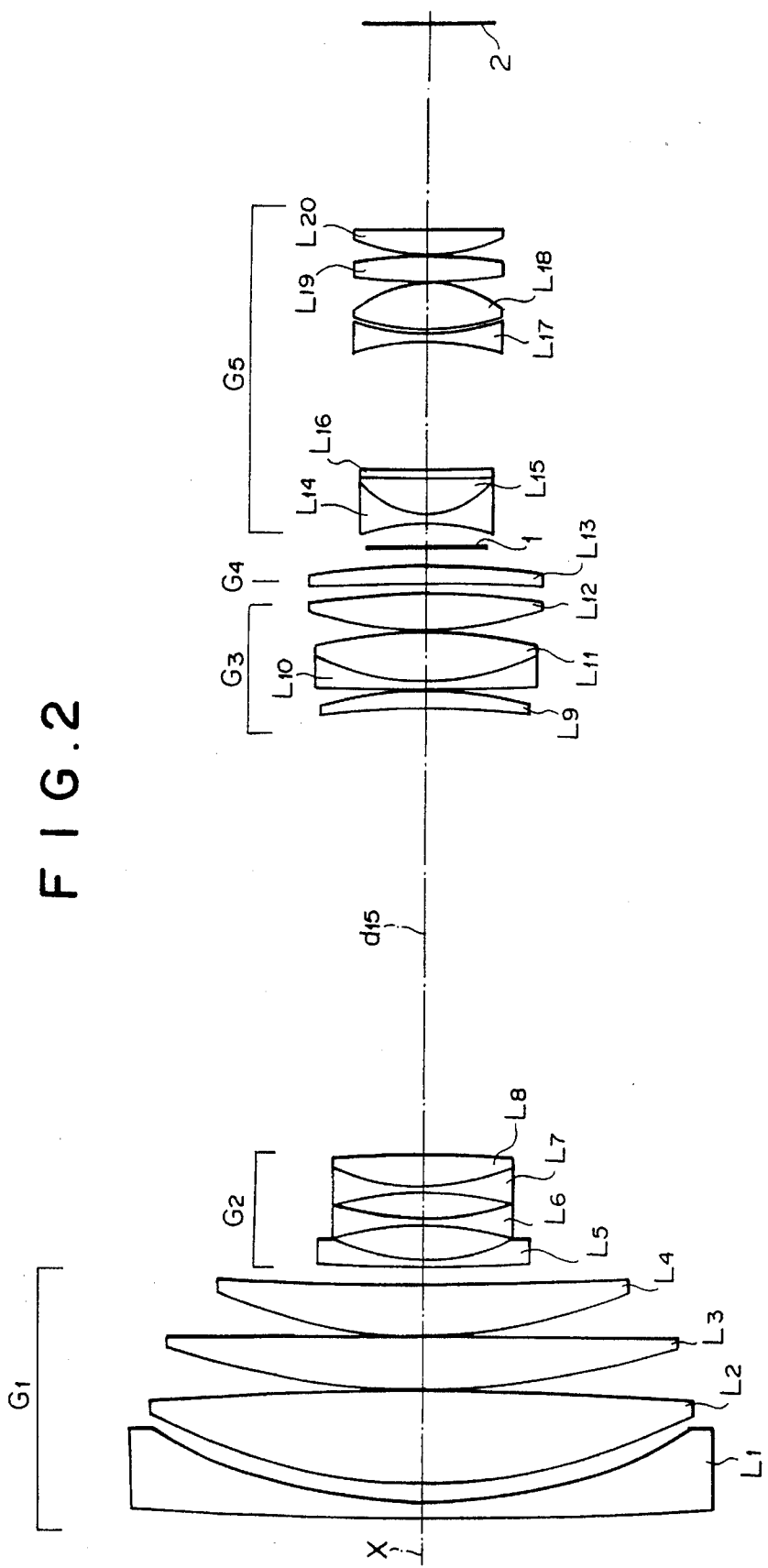
FIG. 2 is a view showing a basic arrangement of the lens elements in zoom lens systems in accordance with first and second embodiments of the present invention.
Figure 3:
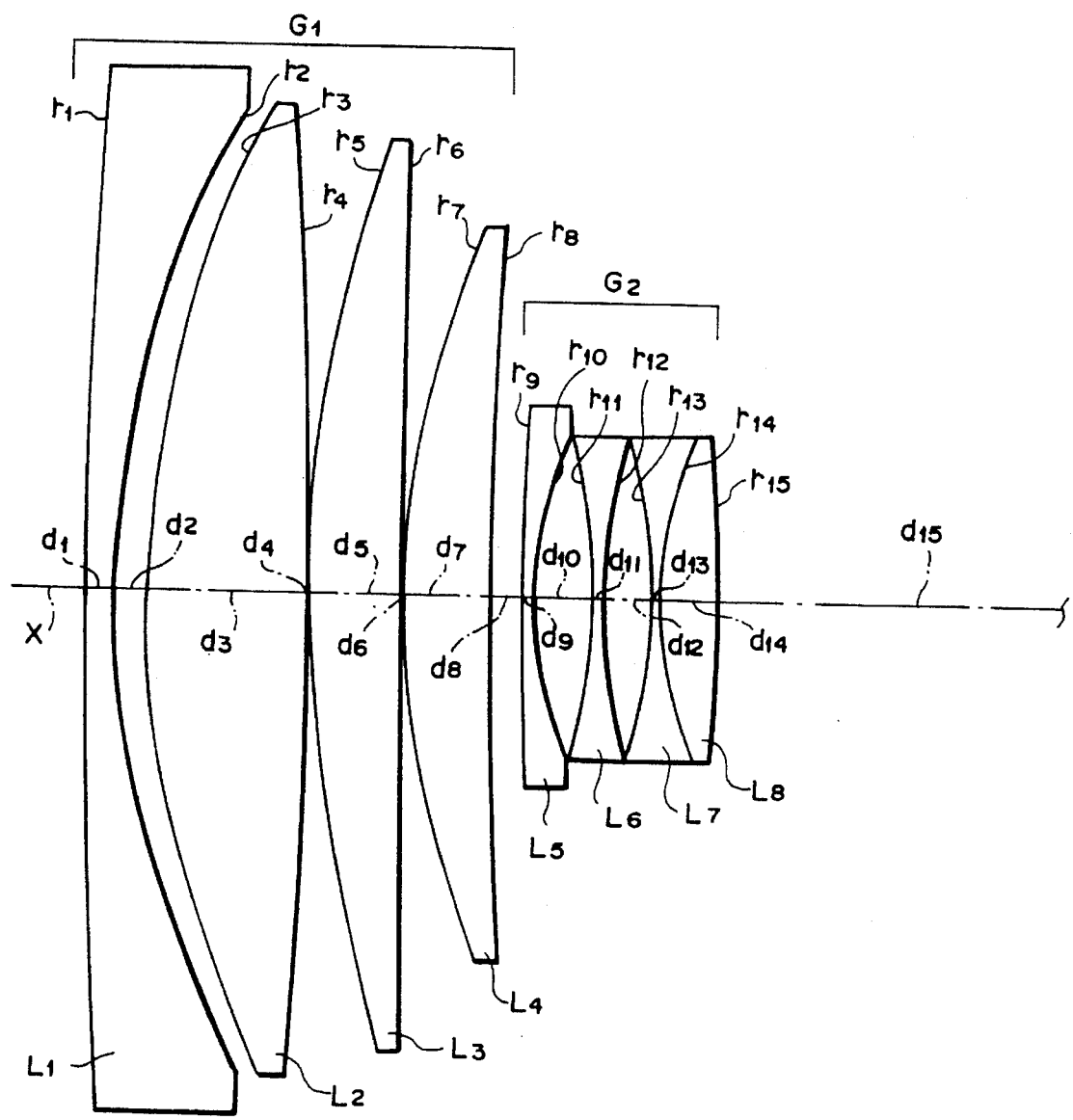
FIG. 3 is an enlarged view of the first and second lens groups G1 and G2 of the zoom lens system shown in FIG. 2.
Figure 4:
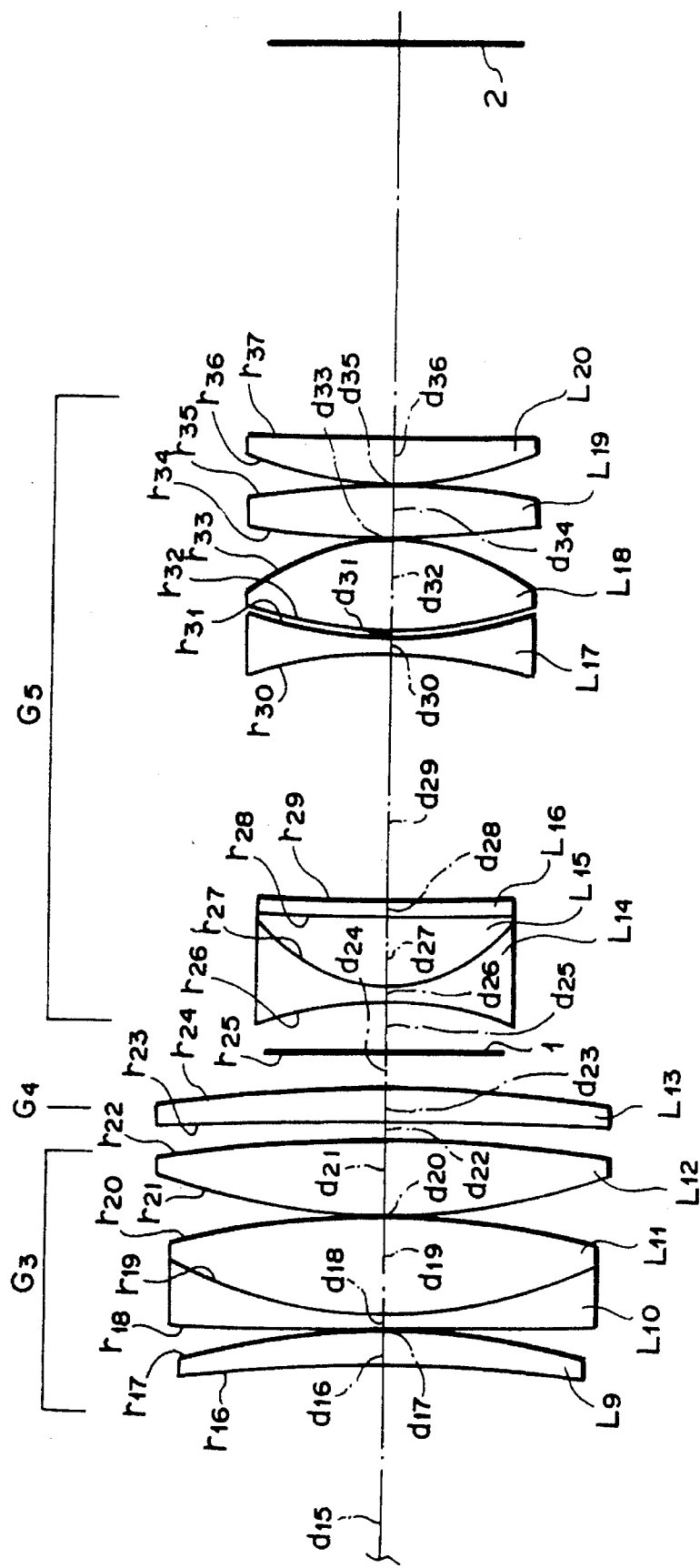
FIG. 4 is an enlarged view of the third to fifth lens groups G3, G4 and G5 of the zoom lens system shown in FIG. 2.
Figure 5:
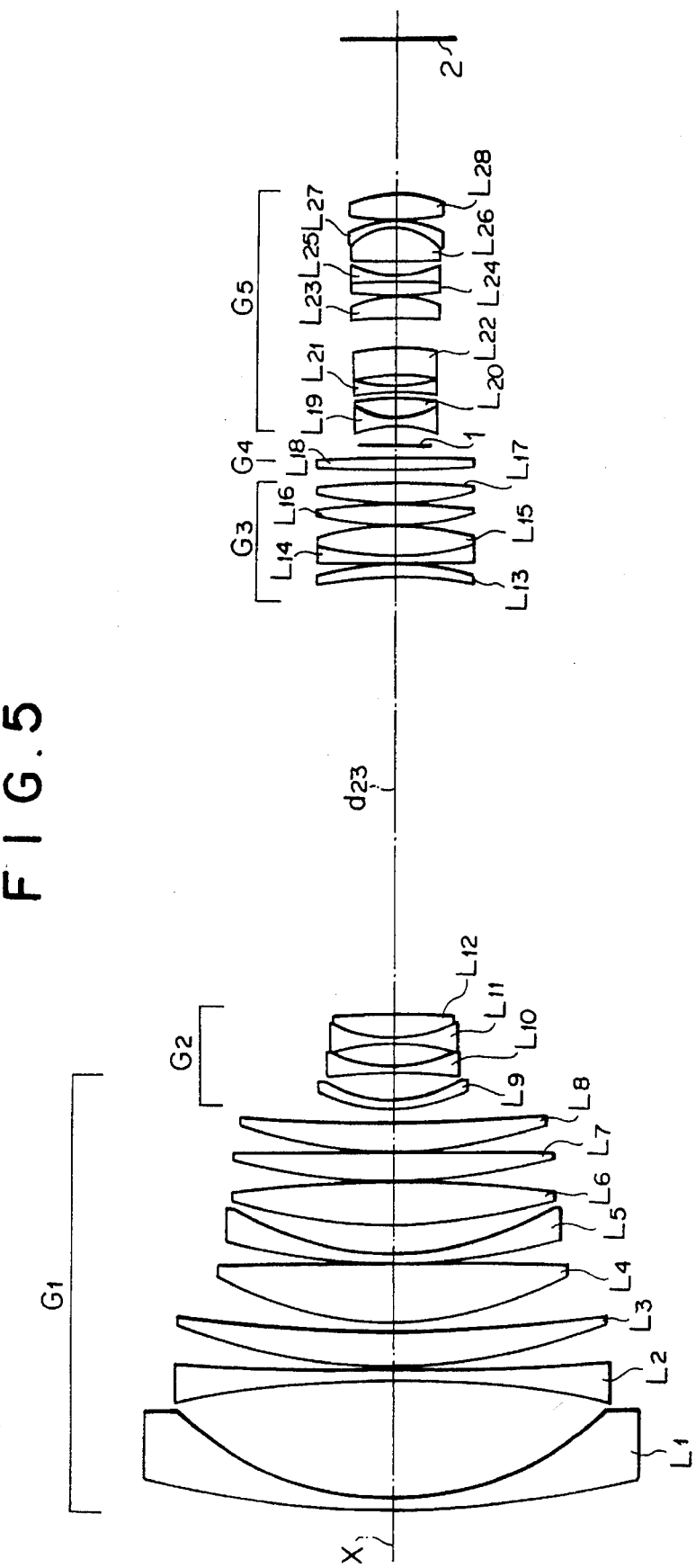
FIG. 5 is a view showing a basic arrangement of the lens elements in zoom lens systems in accordance with third to fifth embodiments of the present invention.
Figure 6:
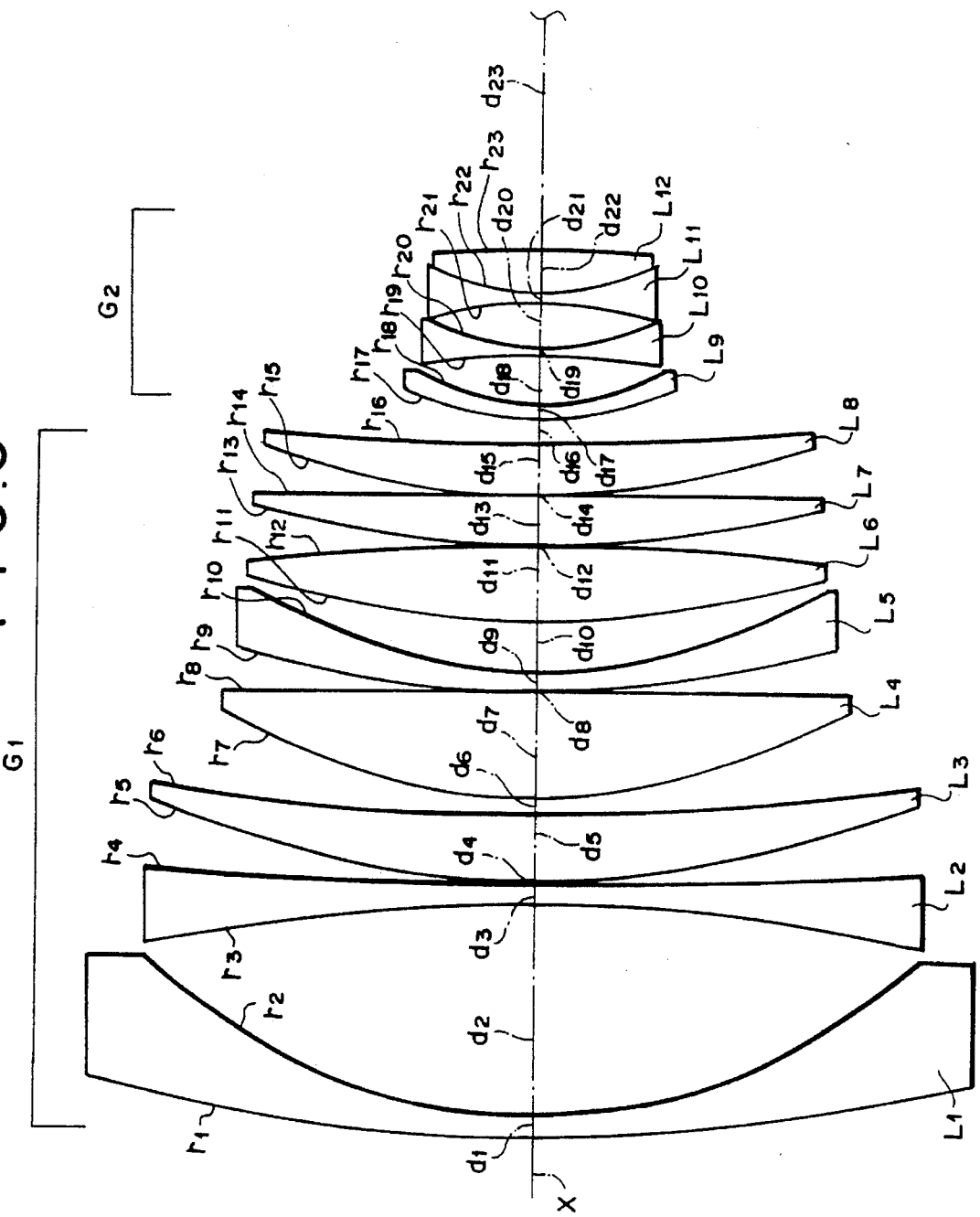
FIG. 6 is an enlarged view of the first and second lens groups G1 and G2 of the zoom lens system shown in FIG. 5.
Figure 7:
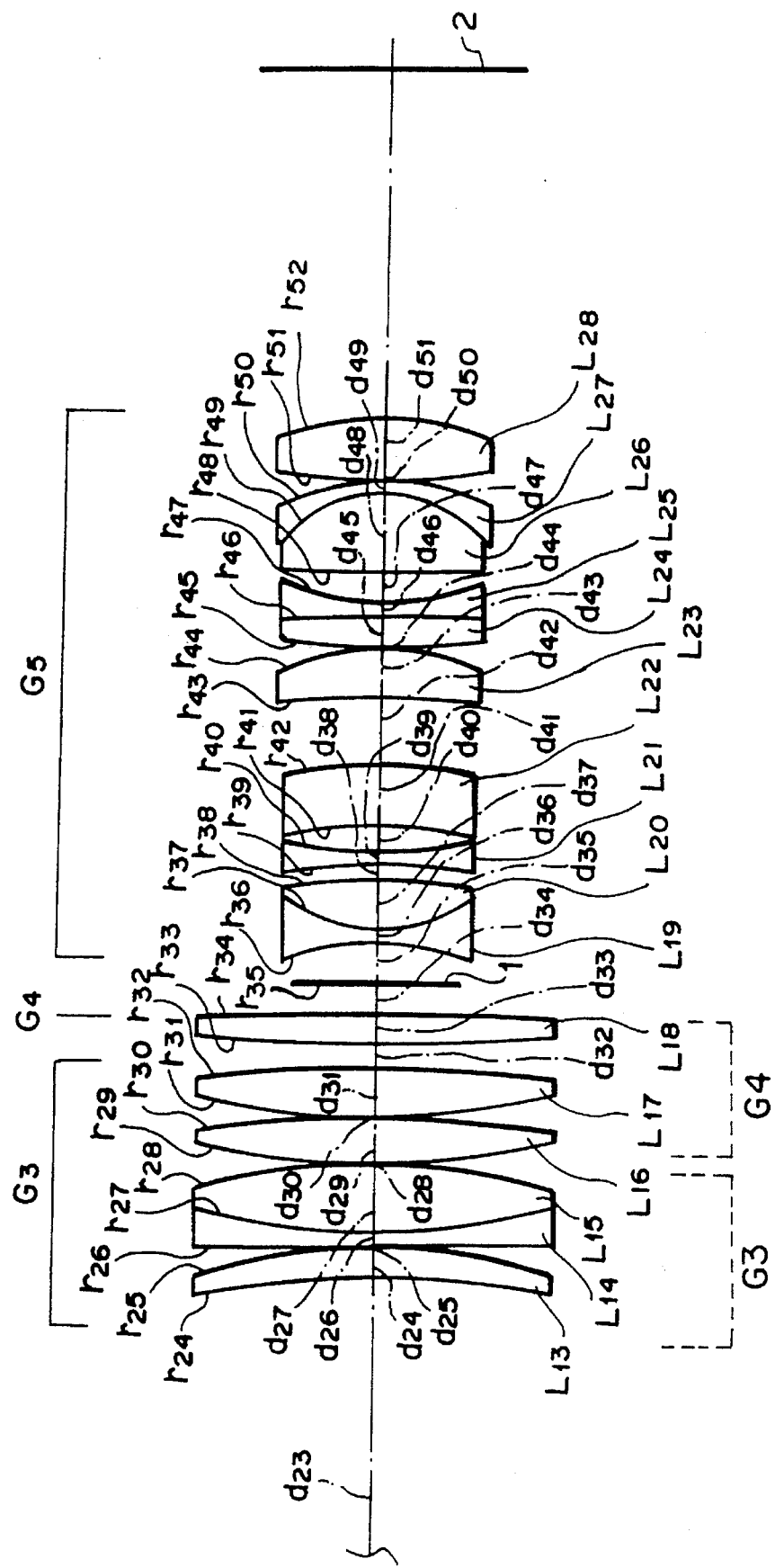
FIG. 7 is an enlarged view of the third to fifth lens groups G3, G4 and G5 of the zoom lens system shown in FIG. 5, FIGS. 8A to 8C respectively show longitudinal aberrations (spherical aberration, astigmatism and distortion) of the zoom lens system in accordance with the first embodiment of the present invention, FIGS. 9A to 9C respectively show longitudinal aberrations (spherical aberration, astigmatism and distortion) of the zoom lens system of a first control.
Figure 10A:
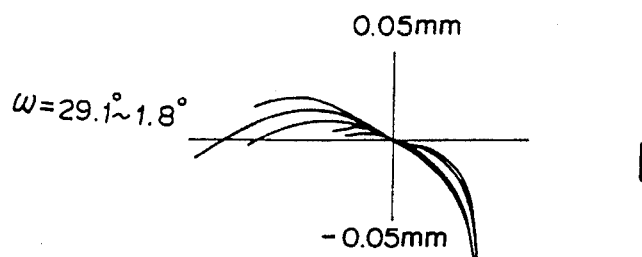
FIGS. 10A to 10D show lateral aberration of the zoom lens system in accordance with the first embodiment of the present invention at different angles of view (2ω) at a given image height.
Figure 10B:
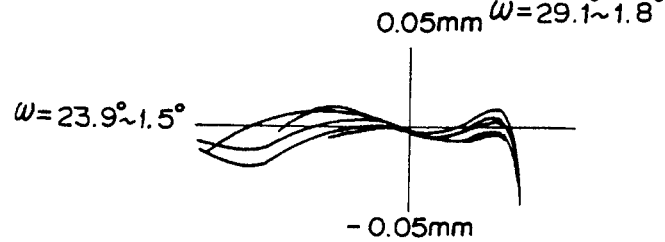
Figure 10C:
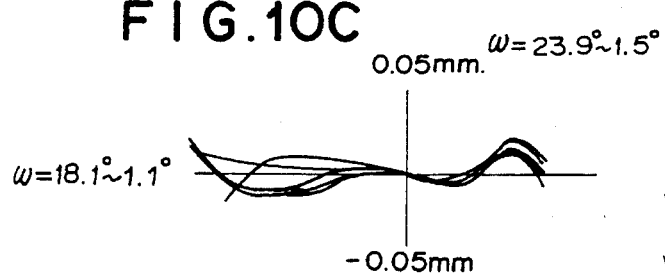
Figure 10D:
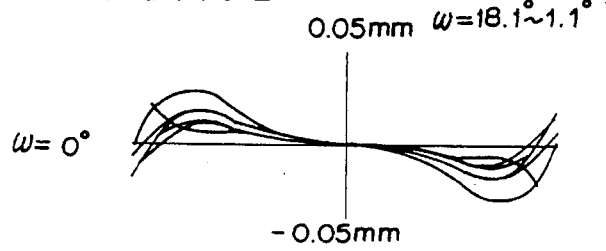
Figure 11A:
FIGS. 11A to 11D are views similar to FIGS. 10A to 10D showing lateral aberration of the zoom lens system of the first control, FIGS. 12A to 12C respectively show longitudinal aberrations (spherical aberration, astigmatism and distortion) of the zoom lens system in accordance with the second embodiment of the present invention, FIGS. 13A to 13C respectively show longitudinal aberrations (spherical aberration, astigmatism and distortion) of the zoom lens system of a second control.
Figure 11B:
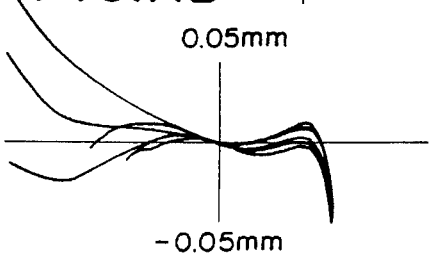
Figure 11C:
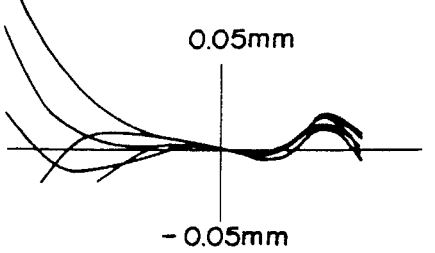
Figure 11D:
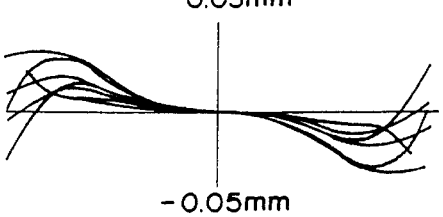
Figure 18A:
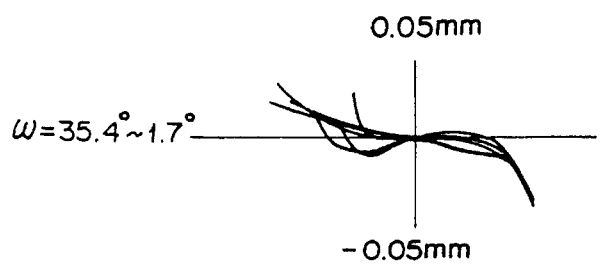
FIGS. 18A to 18D show lateral aberration of the zoom lens system in accordance with the third embodiment of the present invention at different angles of view (2ω) at a given image height.
Figure 18B:
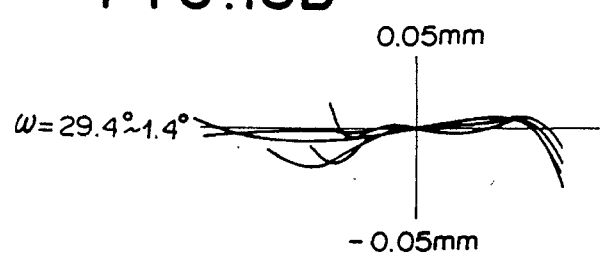
Figure 18C:
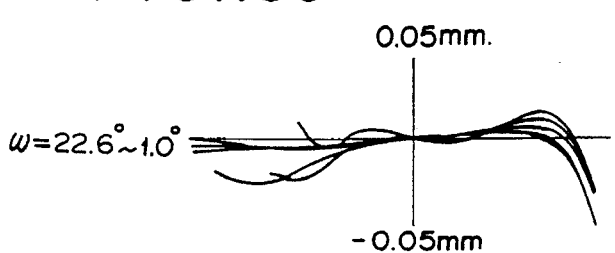
Figure 18D:
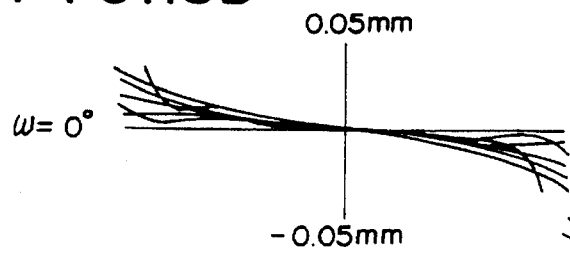
Figure 19A:
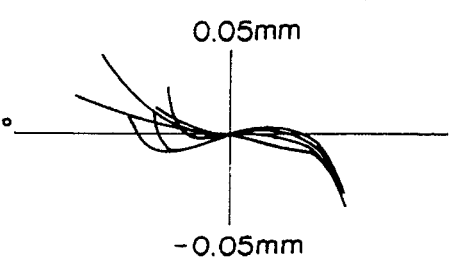
FIGS. 19A to 19D are views similar to FIGS. 18A to 18D showing lateral aberration of the zoom lens system of the third control, FIGS. 20A to 20C respectively show longitudinal aberrations (spherical aberration, astigmatism and distortion) of the zoom lens system in accordance with the fourth embodiment of the present invention, FIGS. 21A to 21C respectively show longitudinal aberrations (spherical aberration, astigmatism and distortion) of the zoom lens system of a fourth control.
Figure 19B:
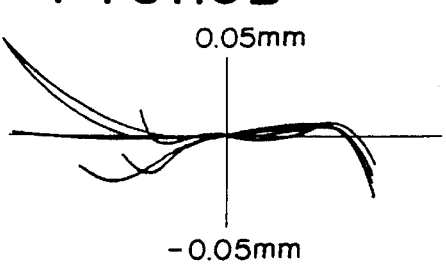
Figure 19C:
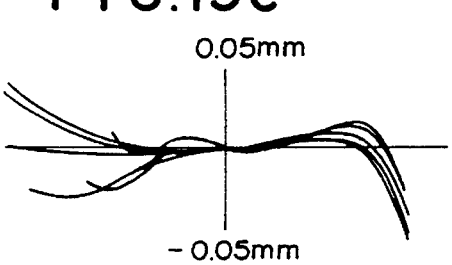
Figure 19D:
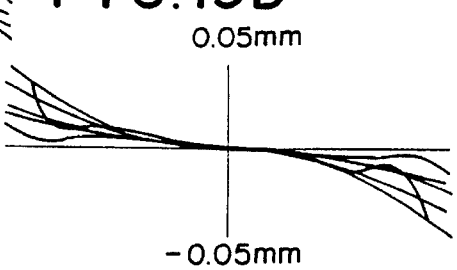
Figure 20A:
Figure 20B:
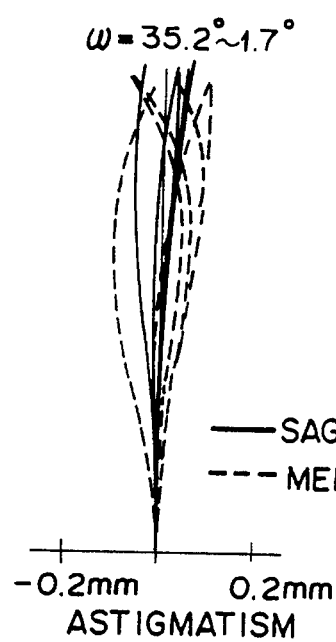
Figure 20C:
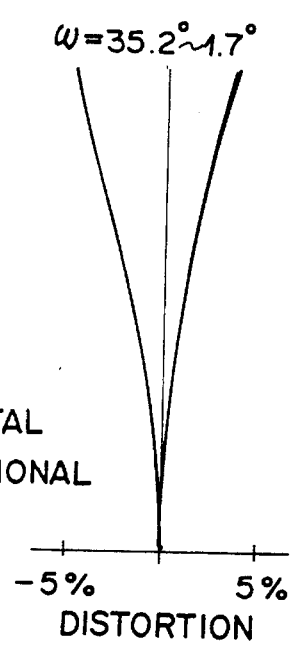
Figure 21A:
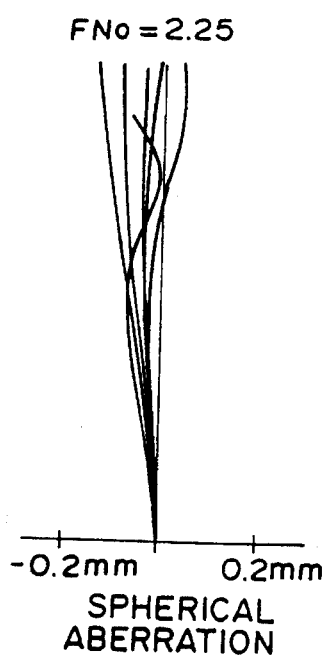
Figure 21B:
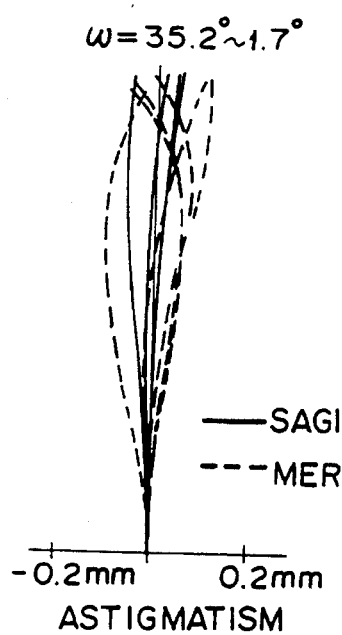
Figure 21C:
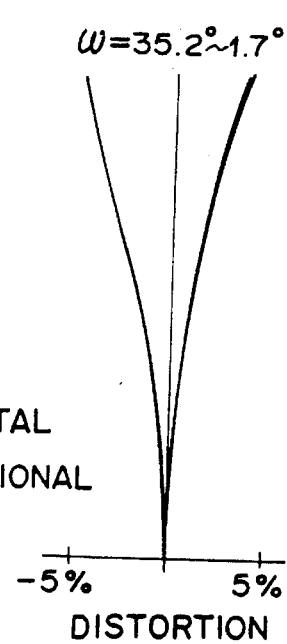
Figure 22A:
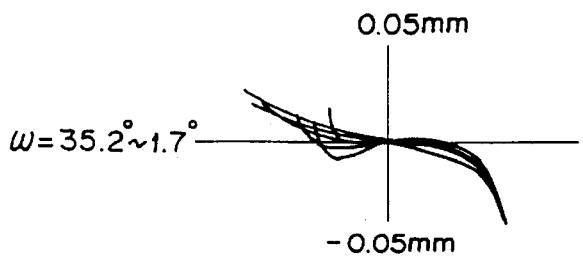
FIGS. 22A to 22D show lateral aberration of the zoom lens system in accordance with the fourth embodiment of the present invention at different angles of view (2ω) at a given image height.
Figure 22B:
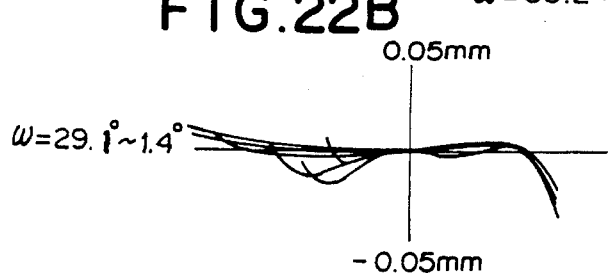
Figure 22C:
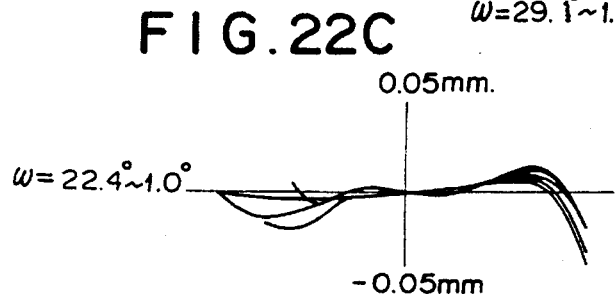
Figure 22D:
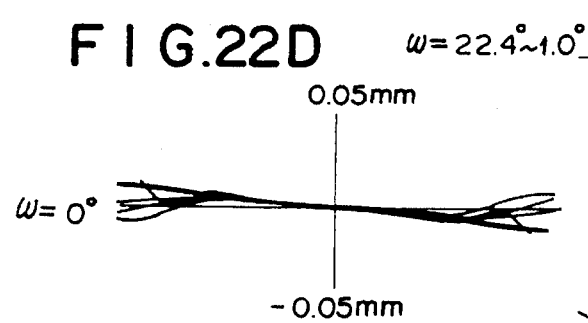
Figure 23A:
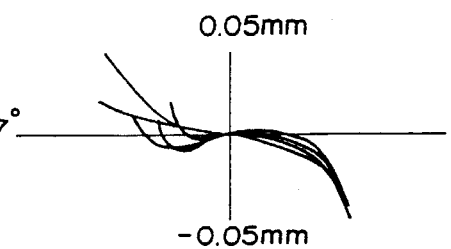
FIGS. 23A to 23D are views similar to FIGS. 22A to 22D showing lateral aberration of the zoom lens system of the fourth control, FIGS. 24A to 24C respectively show longitudinal aberrations (spherical aberration, astigmatism and distortion) of the zoom lens system in accordance with the fifth embodiment of the present invention, FIGS. 25A to 25C respectively show longitudinal aberrations (spherical aberration, astigmatism and distortion) of the zoom lens system of a fifth control.
Figure 23B:
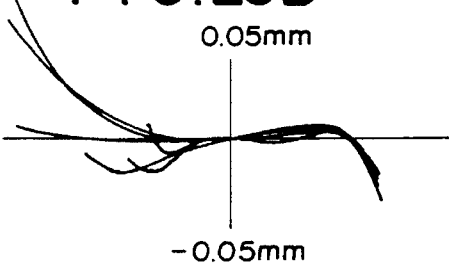
Figure 23C:
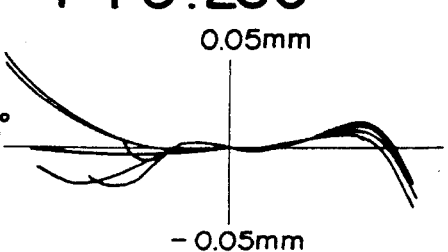
Figure 23D:
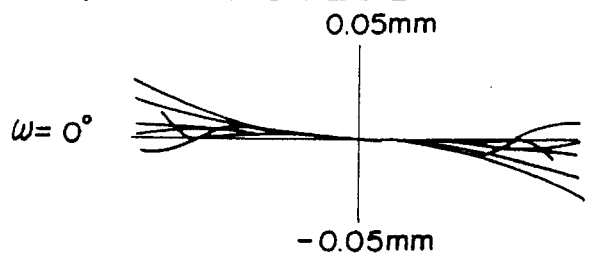
Figure 24A:
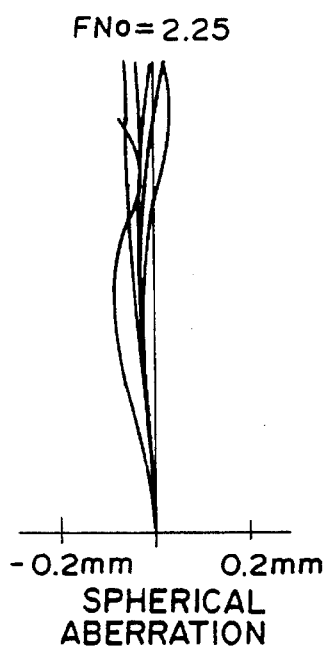
Figure 24B:
Figure 24C:
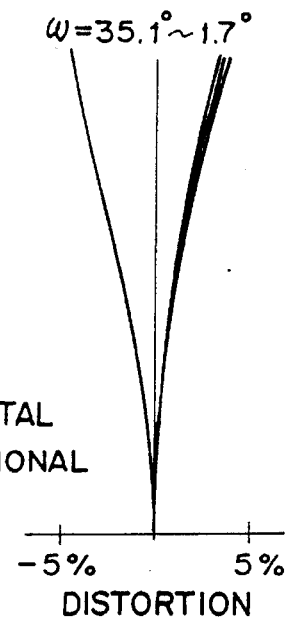
Figure 25A:
Figure 25B:
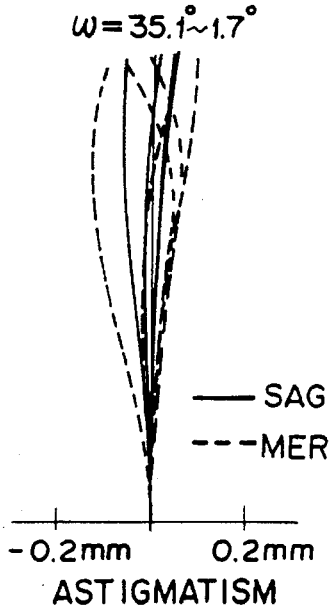
Figure 25C:
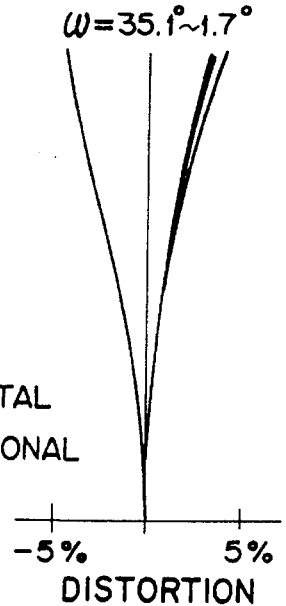
Figure 26A:
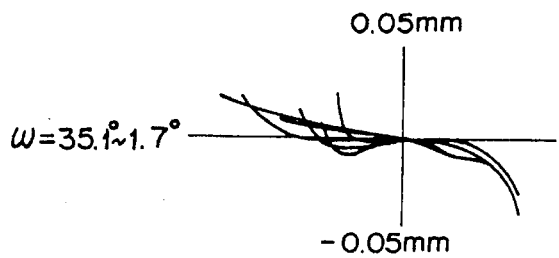
FIGS. 26A to 26D show lateral aberration of the zoom lens system in accordance with the fifth embodiment of the present invention at different angles of view (2ω) at a given image height.
Figure 26B:
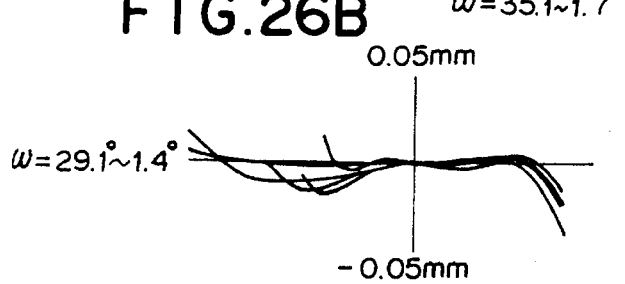
Figure 26C:
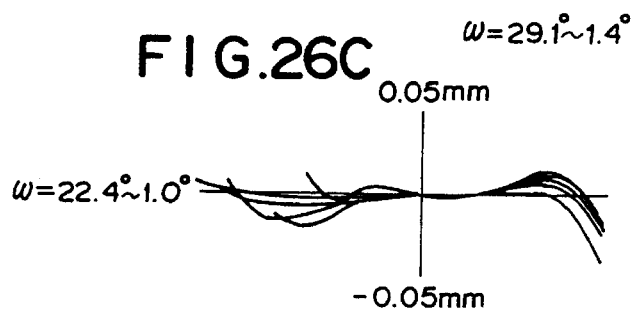
Figure 26D:
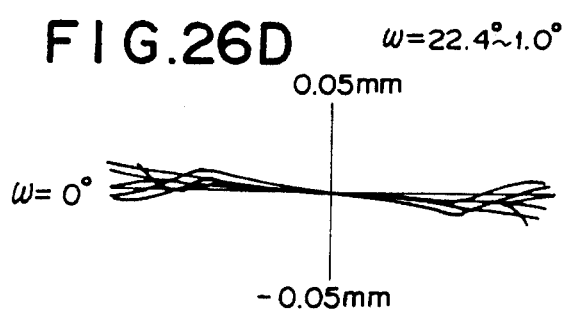
Figure 27A:
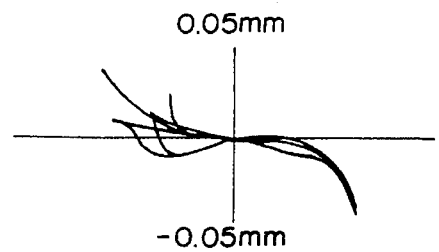
FIGS. 27A to 27D are views similar to FIGS. 26A to 26D showing lateral aberration of the zoom lens system of the fifth control.
Figure 27B:
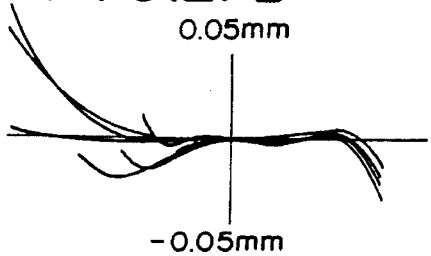
Figure 27C:
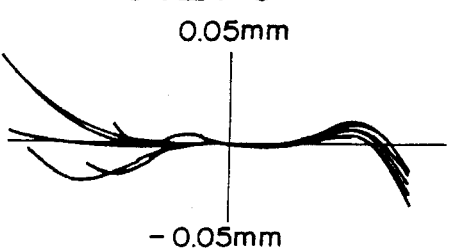
Figure 27D:
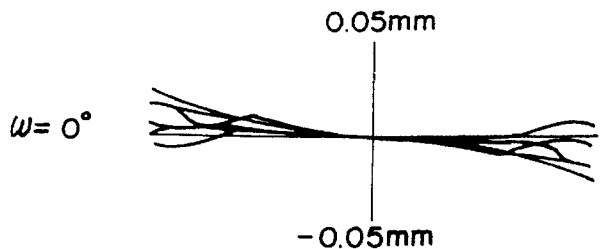

FIG. 2 is a view showing a basic arrangement of the lens elements in zoom lens systems in accordance with first and second embodiments of the present invention, FIG. 3 is an enlarged view of the first and second lens groups G1 and G2 of the zoom lens system shown in FIG. 2, and FIG. 4 is an enlarged view of the third to fifth lens groups G3, G4 and G5 of the zoom lens system shown in FIG. 2. FIG. 5 is a view showing a basic arrangement of the lens elements in zoom lens systems in accordance with third to fifth embodiments of the present invention, FIG. 6 is an enlarged view of the first and second lens groups G1 and G2 of the zoom lens system shown in FIG. 5, and FIG. 7 is an enlarged view of the third to fifth lens groups G3, G4 and G5 of the zoom lens system shown in FIG. 5. In FIGS. 2, 4, 5 and 7, reference numeral 2 denotes an image-forming plane on which the object is focused. In the third embodiment, the third lens group G3 consists of five lens elements L13 to L17 and the fourth lens group G4 consists of a single lens element L18 as indicated by solid line brackets in FIG. 7. In the fourth and fifth embodiments, the third lens group G3 consists of four lens elements L13 to L16 and the fourth lens group G4 consists of a pair of lens elements L17 and L18 as indicated by broken line brackets in FIG. 7. Each of the zoom lens systems of the first to fifth embodiments is focused by moving the first lens group G1 in the direction of the optical axis X.

First Embodiment

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the first embodiment are shown in table 1.

The numbers in the leftmost column of table 1 designate the numbers of the symbols r, d, $N_d$ and $v_d$ as numbered from the object side.

TABLE 1

|    | r       | d        | $n_d$   | $v_d$ |
|----|---------|----------|---------|-------|
| 1  | 1130.8  | 4.0      | 1.80518 | 25.5  |
| 2  | 132.87  | 5.0      |         |       |
| 3  | 143.28  | 23.0     | 1.59240 | 68.3  |
| 4  | −930.86 | 0.2      |         |       |
| 5  | 204.39  | 12.8     | 1.69680 | 55.6  |
| 6  | 6796.7  | 0.2      |         |       |
| 7  | 128.05  | 12.4     | 1.71300 | 53.9  |
| 8  | 819.48  | variable |         |       |
| 9  | 477.35  | 1.5      | 1.71300 | 53.9  |
| 10 | 52.431  | 8.5      |         |       |
| 11 | −78.812 | 1.5      | 1.71300 | 53.9  |
| 12 | 70.270  | 6.8      |         |       |
| 13 | −73.176 | 1.5      | 1.69680 | 55.6  |
| 14 | 53.049  | 8.3      | 1.80518 | 25.5  |
| 15 | −208.93 | variable |         |       |
| 16 | −217.76 | 4.5      | 1.62299 | 58.1  |
| 17 | −93.592 | 0.2      |         |       |
| 18 | 1197.6  | 2.0      | 1.80518 | 25.5  |
| 19 | 59.936  | 12.5     | 1.62299 | 58.1  |
| 20 | −112.29 | 0.2      |         |       |
| 21 | 87.756  | 9.5      | 1.62299 | 58.1  |
| 22 | −179.08 | variable |         |       |
| 23 | −477.19 | 4.3      | 1.59240 | 68.3  |
| 24 | −191.00 | variable |         |       |
| 25 | stop    | 6.5      |         |       |
| 26 | −48.649 | 2.0      | 1.80235 | 46.7  |
| 27 | 20.033  | 9.0      | 1.80518 | 25.5  |
| 28 | 2240.4  | 2.0      | 1.73350 | 51.2  |
| 29 | 303.32  | 31.0     |         |       |
| 30 | −64.753 | 2.0      | 1.84666 | 23.9  |
| 31 | 57.530  | 1.0      |         |       |
| 32 | 60.594  | 11.5     | 1.48749 | 70.4  |
| 33 | −29.202 | 0.2      |         |       |
| 34 | 120.19  | 6.5      | 1.51633 | 64.1  |
| 35 | −125.07 | 0.2      |         |       |
| 36 | 46.992  | 6.0      | 1.51633 | 64.1  |
| 37 | 1042.3  |          |         |       |

The values of $d_8$, $d_{15}$, $d_{22}$ and $d_{24}$, which are variable, at different magnifications (x1, x1.5, x3, x7.1, x10, x12) in the first embodiment are as shown in the following table 2.

TABLE 2

|          | x1      | x1.5    | x3     | x7.1   | x10    | x12    |
|----------|---------|---------|--------|--------|--------|--------|
| $d_8$    | 4.715   | 21.157  | 42.797 | 61.579 | 66.233 | 68.690 |
| $d_{15}$ | 111.188 | 89.000  | 57.063 | 24.311 | 11.069 | 4.204  |
| $d_{22}$ | 2.500   | 7.239   | 7.812  | 2.500  | 1.679  | 2.500  |
| $d_{24}$ | 4.350   | 5.356   | 15.082 | 34.362 | 43.771 | 47.358 |

The focal length f, the back focus $f_B$, F-number $F_{NO}$ and the value of $f_{G3}/f_{G4}$ in the first embodiment are as follows.

$f = 14.00\sim168.00$     $f_B = 49.95$
$F_{NO} = 1.59\sim1.74$    $f_{G3}/f_{G4} = 0.109$

Second Embodiment

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the second embodiment are shown in table 3.

The numbers in the leftmost column of table 3 designate the numbers of the symbols r, d, $N_d$ and $v_d$ as numbered from the object side.

TABLE 3

|    | r        | d        | $n_d$   | $v_d$ |
|----|----------|----------|---------|-------|
| 1  | 1386.2   | 4.0      | 1.80518 | 25.5  |
| 2  | 140.28   | 5.0      |         |       |
| 3  | 151.28   | 20.5     | 1.59240 | 68.3  |
| 4  | −1605.3  | 0.2      |         |       |
| 5  | 191.10   | 16.3     | 1.69680 | 55.6  |
| 6  | −999.99  | 0.2      |         |       |
| 7  | 129.93   | 9.4      | 1.71300 | 53.9  |
| 8  | 409.06   | variable |         |       |
| 9  | 321.75   | 1.5      | 1.71300 | 53.9  |
| 10 | 53.347   | 8.5      |         |       |
| 11 | −82.829  | 1.5      | 1.71300 | 53.9  |
| 12 | 69.351   | 6.8      |         |       |
| 13 | −66.853  | 1.5      | 1.69680 | 55.6  |
| 14 | 57.022   | 8.3      | 1.80518 | 25.5  |
| 15 | −170.02  | variable |         |       |
| 16 | −292.46  | 4.5      | 1.62299 | 58.1  |
| 17 | −98.975  | 0.2      |         |       |
| 18 | 2649.5   | 2.0      | 1.80518 | 25.5  |
| 19 | 62.132   | 10.5     | 1.62299 | 58.1  |
| 20 | −137.14  | 0.2      |         |       |
| 21 | 99.771   | 7.5      | 1.62299 | 58.1  |
| 22 | −819.17  | variable |         |       |
| 23 | 275.45   | 6.3      | 1.59240 | 68.3  |
| 24 | −151.64  | variable |         |       |
| 25 | stop     | 6.5      |         |       |
| 26 | −53.921  | 2.0      | 1.80235 | 46.7  |
| 27 | 20.864   | 9.0      | 1.80518 | 25.5  |
| 28 | −1019.6  | 2.0      | 1.73350 | 51.2  |
| 29 | 312.20   | 31.0     |         |       |
| 30 | −58.732  | 2.0      | 1.84666 | 23.9  |
| 31 | 60.260   | 1.0      |         |       |
| 32 | 62.802   | 11.5     | 1.48749 | 70.4  |
| 33 | −30.031  | 0.2      |         |       |
| 34 | 105.83   | 6.5      | 1.51633 | 64.1  |
| 35 | −94.960  | 0.2      |         |       |
| 36 | 46.240   | 6.0      | 1.51633 | 64.1  |
| 37 | 235.34   |          |         |       |

The values of $d_8$, $d_{15}$, $d_{22}$ and $d_{24}$, which are variable, at different magnifications (x1, x1.5, x3, x7.1, x10, x12) in the second embodiment are as shown in the following table 4.

TABLE 4

|          | x1      | x1.5    | x3     | x7.1   | x10    | x12    |
|----------|---------|---------|--------|--------|--------|--------|
| $d_8$    | 4.514   | 21.087  | 42.752 | 63.494 | 68.574 | 70.888 |
| $d_{15}$ | 114.725 | 91.306  | 57.455 | 24.882 | 11.398 | 4.087  |
| $d_{22}$ | 2.500   | 5.283   | 6.573  | 2.500  | 2.500  | 2.500  |
| $d_{24}$ | 3.494   | 7.557   | 18.453 | 34.357 | 42.761 | 47.757 |

The focal length f, the back focus $f_B$, F-number $F_{NO}$ and the value of $f_{G3}/f_{G4}$ in the second embodiment are as follows.

$f = 14.01\sim168.10$     $f_B = 49.95$
$F_{NO} = 1.59\sim1.74$    $f_{G3}/f_{G4} = 0.467$

Third Embodiment

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the third embodiment are shown in table 5.

The numbers in the leftmost column of table 5 designate the numbers of the symbols r, d, $N_d$ and $v_d$ as numbered from the object side.

TABLE 5

|  | r | d | $n_d$ | $v_d$ |
|---|---|---|---|---|
| 1 | 349.40 | 4.3 | 1.77250 | 49.6 |
| 2 | 110.70 | 43.0 | | |
| 3 | −373.76 | 3.8 | 1.77250 | 49.6 |
| 4 | 1484.1 | 1.0 | | |
| 5 | 203.22 | 12.8 | 1.84666 | 23.9 |
| 6 | 546.38 | 3.5 | | |
| 7 | 126.25 | 21,0 | 1.43875 | 95.0 |
| 8 | −4532.2 | 0.2 | | |
| 9 | 228.12 | 3.7 | 1.80518 | 25.4 |
| 10 | 111.40 | 10.0 | | |
| 11 | 197.20 | 15.0 | 1.49700 | 81.6 |
| 12 | −483.95 | 0.2 | | |
| 13 | 219.35 | 10.3 | 1.49700 | 81.6 |
| 14 | −7105.3 | 0.2 | | |
| 15 | 165.95 | 10.0 | 1.61800 | 63.4 |
| 16 | 612.97 | variable | | |
| 17 | 61.662 | 3.0 | 1.74100 | 52.7 |
| 18 | 46.954 | 10.0 | | |
| 19 | −151.15 | 2.0 | 1.80610 | 40.9 |
| 20 | 51.978 | 8.7 | | |
| 21 | −72.054 | 2.0 | 1.72916 | 54.8 |
| 22 | 49.070 | 8.3 | 1.84666 | 23.9 |
| 23 | −483.40 | variable | | |
| 24 | −149.71 | 5.0 | 1.49700 | 81.6 |
| 25 | −90.440 | 0.2 | | |
| 26 | ∞ | 2.4 | 1.84666 | 23.9 |
| 27 | 98.116 | 11.0 | 1.49700 | 81.6 |
| 28 | −95.630 | 0.2 | | |
| 29 | 118.93 | 7.5 | 1.49700 | 81.6 |
| 30 | −191.50 | 0.2 | | |
| 31 | 104.98 | 7.7 | 1.49700 | 81.6 |
| 32 | −223.96 | variable | | |
| 33 | 417.53 | 4.5 | 1.49700 | 81.6 |
| 34 | −465.56 | variable | | |
| 35 | stop | 6.5 | | |
| 36 | −41.887 | 2.0 | 1.77250 | 49.6 |
| 37 | 26.882 | 7.4 | 1.84666 | 23.9 |
| 38 | −113.43 | 2.3 | | |
| 39 | −100.95 | 2.0 | 1.80400 | 46.6 |
| 40 | 79.216 | 3.7 | | |
| 41 | −85.895 | 10.0 | 1.73400 | 51.5 |
| 42 | −67.941 | 10.0 | | |
| 43 | −202.20 | 8.0 | 1.51680 | 64.2 |
| 44 | −37.675 | 0.2 | | |
| 45 | 177.29 | 5.0 | 1.51742 | 52.4 |
| 46 | −434.79 | 2.0 | 1.83481 | 42.7 |
| 47 | 38.009 | 5.0 | | |
| 48 | 3150.4 | 12.3 | 1.51680 | 64.2 |
| 49 | −20.114 | 2.0 | 1.80518 | 25.4 |
| 50 | −39.369 | 0.2 | | |
| 51 | 91.817 | 9.7 | 1.51680 | 64.2 |
| 52 | −40.904 | | | |

The values of $d_{16}$, $d_{23}$, $d_{32}$ and $d_{34}$, which are variable, at different magnifications (×1, ×2, ×5, ×10, ×14, ×17.3) in the third embodiment are as shown in the following table 6.

TABLE 6

|  | ×1 | ×2 | ×5 | ×10 | ×14 | ×17.3 |
|---|---|---|---|---|---|---|
| $d_{16}$ | 5.184 | 48.355 | 88.132 | 107.889 | 114.570 | 118.268 |
| $d_{23}$ | 157.382 | 106.587 | 56.814 | 26.992 | 13.007 | 4.404 |
| $d_{32}$ | 4.500 | 11.461 | 7.206 | 4.094 | 4.500 | 4.500 |
| $d_{34}$ | 4.542 | 5.204 | 19.455 | 32.702 | 39.531 | 44.436 |

The focal length f, the back focus $f_B$, F-number $F_{NO}$ and the value of $f_{G3}/f_{G4}$ in the third embodiment are as follows.

f = 12.18–210.74   $f_B$ = 54.98
$F_{NO}$ = 2.25–2.54   $f_{G3}/f_{G4}$ = 0.131

Fourth Embodiment

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the fourth embodiment are shown in table 7.

The numbers in the leftmost column of table 7 designate the numbers of the symbols r, d, $N_d$ and $v_d$ as numbered from the object side.

TABLE 7

|  | r | d | $n_d$ | $v_d$ |
|---|---|---|---|---|
| 1 | 350.81 | 4.3 | 1.77250 | 49.6 |
| 2 | 110.28 | 43.0 | | |
| 3 | −371.42 | 3.8 | 1.77250 | 49.6 |
| 4 | 1520.4 | 1.0 | | |
| 5 | 203.02 | 12.8 | 1.84666 | 23.9 |
| 6 | 547.51 | 3.5 | | |
| 7 | 131.92 | 23.0 | 1.43875 | 95.0 |
| 8 | −2447.0 | 0.2 | | |
| 9 | 242.88 | 3.7 | 1.80518 | 25.4 |
| 10 | 115.64 | 10.0 | | |
| 11 | 204.65 | 16.0 | 1.49700 | 81.6 |
| 12 | −450.67 | 0.2 | | |
| 13 | 207.68 | 11.8 | 1.49700 | 81.6 |
| 14 | −5428.9 | 0.2 | | |
| 15 | 180.00 | 10.0 | 1.61800 | 63.4 |
| 16 | 662.36 | variable | | |
| 17 | 64.401 | 3.0 | 1.74100 | 52.7 |
| 18 | 48.560 | 11.0 | | |
| 19 | −148.20 | 2.0 | 1.80610 | 40.9 |
| 20 | 54.067 | 8.7 | | |
| 21 | −66.091 | 2.0 | 1.72916 | 54.8 |
| 22 | 54.060 | 8.3 | 1.84666 | 23.9 |
| 23 | −287.63 | variable | | |
| 24 | −196.19 | 5.0 | 1.49700 | 81.6 |
| 25 | −87.133 | 0.2 | | |
| 26 | 431.00 | 2.4 | 1.84666 | 23.9 |
| 27 | 83.964 | 11.5 | 1.49700 | 81.6 |
| 28 | −106.38 | 0.2 | | |
| 29 | 88.030 | 8.0 | 1.49700 | 81.6 |
| 30 | −264.76 | variable | | |
| 31 | 1540.1 | 6.0 | 1.49700 | 81.6 |
| 32 | −152.19 | 0.2 | | |
| 33 | 116.55 | 6.0 | 1.49700 | 81.6 |
| 34 | 552.65 | variable | | |
| 35 | stop | 6.5 | | |
| 36 | 41.640 | 2.0 | 1.77250 | 49.6 |
| 37 | 26.793 | 7.4 | 1.84666 | 23.9 |
| 38 | −122.90 | 2.3 | | |
| 39 | −99.853 | 2.0 | 1.80400 | 46.6 |
| 40 | 77.793 | 3.7 | | |
| 41 | −82.090 | 10.0 | 1.73400 | 51.5 |
| 42 | −60.534 | 10.0 | | |
| 43 | −216.80 | 8.0 | 1.51680 | 64.2 |
| 44 | −37.895 | 0.2 | | |

TABLE 7-continued

| | r | d | $n_d$ | $v_d$ |
|---|---|---|---|---|
| 45 | 166.31 | 5.0 | 1.51742 | 52.4 |
| 46 | −516.04 | 2.0 | 1.83481 | 42.7 |
| 47 | 39.309 | 5.0 | | |
| 48 | ∞ | 12.3 | 1.51680 | 64.2 |
| 49 | −20.305 | 2.0 | 1.80518 | 25.4 |
| 50 | −40.888 | 0.2 | | |
| 51 | 87.700 | 9.7 | 1.51680 | 64.2 |
| 52 | −42.061 | | | |

The values of $d_{16}$, $d_{23}$, $d_{32}$ and $d_{34}$, which are variable, at different magnifications (×1, ×2, ×5, ×10, ×14, ×17.3) in the fourth embodiment are as shown in the following table 8.

TABLE 8

| | ×1 | ×2 | ×5 | ×10 | ×14 | ×17.3 |
|---|---|---|---|---|---|---|
| $d_{16}$ | 5.326 | 47.462 | 88.360 | 110.512 | 116.929 | 120.706 |
| $d_{23}$ | 160.117 | 107.454 | 56.437 | 27.459 | 12.938 | 4.168 |
| $d_{32}$ | 4.500 | 10.758 | 8.245 | 3.940 | 4.500 | 4.500 |
| $d_{34}$ | 3.923 | 8.193 | 20.825 | 31.956 | 39.500 | 44.493 |

The focal length f, the back focus $f_B$, F-number $F_{NO}$ and the value of $f_{G3}/f_{G4}$ in the fourth embodiment are as follows.

| | |
|---|---|
| f = 12.28~212.45 | $f_B$ = 54.66 |
| $F_{NO}$ = 2.25~2.54 | $f_{G3}/f_{G4}$ = 0.537 |

Fifth Embodiment

The radii of curvature r(mm) of the refracting surfaces, the axial surface separations d(mm) (the central thicknesses of the lenses or the air separations), and the refractive indexes $N_d$ and the Abbe's numbers $v_d$ of the lenses for the sodium d-line in the zoom lens system in accordance with the fifth embodiment are shown in table 9.

The numbers in the leftmost column of table 9 designate the numbers of the symbols r, d, $N_d$ and $v_d$ as numbered from the object side.

TABLE 7

| | r | d | $n_d$ | $v_d$ |
|---|---|---|---|---|
| 1 | 347.90 | 4.3 | 1.77250 | 49.6 |
| 2 | 110.87 | 43.0 | | |
| 3 | −370.66 | 3.8 | 1.77250 | 49.6 |
| 4 | 1454.0 | 1.0 | | |
| 5 | 204.31 | 12.8 | 1.84666 | 23.9 |
| 6 | 557.76 | 3.5 | | |
| 7 | 130.98 | 23.0 | 1.43875 | 95.0 |
| 8 | −1610.2 | 0.2 | | |
| 9 | 244.09 | 3.7 | 1.80518 | 25.4 |
| 10 | 114.23 | 10.0 | | |
| 11 | 206.36 | 16.0 | 1.49700 | 81.6 |
| 12 | −519.76 | 0.2 | | |
| 13 | 207.87 | 11.8 | 1.49700 | 81.6 |
| 14 | −7658.5 | 0.2 | | |
| 15 | 169.77 | 10.0 | 1.61800 | 63.4 |
| 16 | 801.70 | variable | | |
| 17 | 67.440 | 3.0 | 1.74100 | 52.7 |
| 18 | 47.160 | 11.0 | | |
| 19 | −136.01 | 2.0 | 1.80610 | 40.9 |
| 20 | 54.204 | 8.7 | | |
| 21 | −64.952 | 2.0 | 1.72916 | 54.8 |
| 22 | 54.638 | 8.3 | 1.84666 | 23.9 |
| 23 | −255.92 | variable | | |
| 24 | −177.15 | 5.0 | 1.49700 | 81.6 |
| 25 | −90.538 | 0.2 | | |

TABLE 7-continued

| | r | d | $n_d$ | $v_d$ |
|---|---|---|---|---|
| 26 | 1252.9 | 2.4 | 1.84666 | 23.9 |
| 27 | 90.993 | 11.5 | 1.49700 | 81.6 |
| 28 | −110.33 | 0.2 | | |
| 29 | 106.59 | 8.0 | 1.49700 | 81.6 |
| 30 | −332.45 | variable | | |
| 31 | 352.20 | 6.0 | 1.49700 | 81.6 |
| 32 | −129.75 | 0.2 | | |
| 33 | 108.11 | 6.0 | 1.49700 | 81.6 |
| 34 | ∞ | variable | | |
| 35 | stop | 6.5 | | |
| 36 | −46.386 | 2.0 | 1.77250 | 49.6 |
| 37 | 28.078 | 7.4 | 1.84666 | 23.9 |
| 38 | −111.79 | 2.3 | | |
| 39 | −107.47 | 2.0 | 1.80400 | 46.6 |
| 40 | 87.536 | 3.7 | | |
| 41 | −88.934 | 10.0 | 1.73400 | 51.5 |
| 42 | −83.135 | 10.0 | | |
| 43 | −206.76 | 8.0 | 1.51680 | 64.2 |
| 44 | −39.158 | 0.2 | | |
| 45 | 175.30 | 5.0 | 1.51742 | 52.4 |
| 46 | −545.11 | 2.0 | 1.83481 | 42.7 |
| 47 | 41.015 | 5.0 | | |
| 48 | −1096.5 | 12.3 | 1.51680 | 64.2 |
| 49 | −20.178 | 2.0 | 1.80518 | 25.4 |
| 50 | −41.301 | 0.2 | | |
| 51 | 100.26 | 9.7 | 1.51680 | 64.2 |
| 52 | −41.328 | | | |

The values of $d_{16}$, $d_{23}$, $d_{32}$ and $d_{34}$, which are variable, at different magnifications (×1, ×2, ×5, ×10, ×14, ×17.3) in the fifth embodiment are as shown in the following table 10.

TABLE 8

| | ×1 | ×2 | ×5 | ×10 | ×14 | ×17.3 |
|---|---|---|---|---|---|---|
| $d_{16}$ | 5.229 | 45.807 | 85.494 | 107.474 | 113.414 | 117.047 |
| $d_{23}$ | 156.312 | 103.924 | 54.392 | 27.281 | 12.789 | 4.236 |
| $d_{32}$ | 4.500 | 10.638 | 8.307 | 3.788 | 4.500 | 4.500 |
| $d_{34}$ | 4.187 | 9.858 | 22.035 | 31.685 | 39.525 | 44.445 |

The focal length f, the back focus $f_B$, F-number $F_{NO}$ and the value of $f_{G3}/f_{G4}$ in the fifth embodiment are as follows.

| | |
|---|---|
| f = 12.29~212.60 | $f_B$ = 58.56 |
| $F_{NO}$ = 2.25~2.54 | $f_{G3}/f_{G4}$ = 0.962 |

Longitudinal aberrations (spherical aberration, astigmatism and distortion) of the zoom lens systems in accordance with the first to fifth embodiments described above are shown in FIGS. 8A to 8C, 12A to 12C, 16A to 16C, 20A to 20C and 24A to 24C, and those of first to fifth controls where the distance between the third and fourth lens groups G3 and G4 is fixed during zooming are shown in FIGS. 9A to 9C, 13A to 13C, 17A to 17C, 21A to 21C and 25A to 25C. Lateral aberration of the zoom lens systems in accordance with the first to fifth embodiments at different angles of view (2ω) at a given image height are shown in FIGS. 10A to 10D, 14A to 14D, 18A to 18D, 22A to 22D and 26A to 26D, and those of first to fifth controls where the distance between the third and fourth lens groups G3 and G4 is fixed during zooming are shown in FIGS. 11A to 11D, 15A to 15D, 19A to 19D, 23A to 23D and 27A to 27D.

As can be understood from the FIGS. 8 (8A to 8C) to 27 (27A to 27D), in the zoom lens systems of the first to fifth embodiments, the aberrations are well compensated for and especially fluctuation in coma is greatly reduced.

Though in the embodiments described above, the third and fourth lens groups G3 and G4 are fed in such a manner that the distance therebetween is once increased and then gradually reduced as the zooming position approaches the tele-side end, the distance between the third and fourth lens groups G3 and G4 may be slightly increased again after once reduced.

What is claimed is:

1. A zoom lens system arranged from an object side to an image forming side comprising a first lens group G1 which has a positive refracting power and is held stationary when zooming, second, third and fourth lens group G2, G3, and G4 which are moved when zooming to establish a zooming position, a stop and a fifth lens group G5 for image-forming, the first to fourth lens groups G1 to G4, the stop and the fifth lens group G5 being arranged in this order from the object side to the image forming side, wherein the second to fourth lens groups G2 to G4 are moved during zooming with it distance between the third and fourth lens groups G3 and G4 varied so that fluctuation in coma with change in the zooming position is well suppressed.

2. A zoom lens system arranged from an object side to an image forming side comprising a first lens group G1 which has a positive refracting power and is held stationary when zooming, second, third and fourth lens group G2, G3, and G4 which are moved when zooming to establish a zooming position, a stop and a fifth lens group G5 for image-forming, the first to fourth lens groups G1 to G4, the stop and the fifth lens group G5 being arranged in this order from the object side to the image forming side, wherein the second to fourth lens groups G2 to G4 are moved during zooming with a distance between the third and fourth lens groups G3 and G4 varied, and wherein $0.10 \leq f_{G3}/f_{G4} \leq 1.05$ where $f_{G3}$ and $f_{G4}$ respectively represent the focal lengths of the third and fourth lens groups G3 and G4.

3. The zoom lens system of claim 2 wherein the distance between the third and fourth lens groups G3 and G4 is varied to suppress fluctuation in coma with change in the zooming position.

4. The zoom lens system of claim 2 wherein the distance between the third and fourth lens groups is increased and then reduced as the third and fourth lens groups move during zooming from a wide-side end to a tele-side end.

5. The zoom lens system of claim 4 wherein the distance between the third and fourth lens groups is increased again after being reduced.

6. The zoom lens system of claim 2 wherein the third lens group consists of five elements and the fourth lens group consists of a single lens element.

7. The zoom lens system of claim 2 wherein the third lens group consists of four elements and the fourth lens group consists of a pair of lens elements.

8. The zoom lens system of claim 1 wherein the distance between the third and fourth lens groups is increased and then reduced as the third and fourth lens groups move during zooming from a wide-side end to a tele-side end.

9. The zoom lens system of claim 8 wherein the distance between the third and fourth lens groups is increased again after being reduced.

10. The zoom lens system of claim 1 wherein the third lens group consists of five elements and the fourth lens group consists of a single lens element.

11. The zoom lens system of claim 1 wherein the third lens group consists of four elements and the fourth lens group consists of a pair of lens elements.

* * * * *